United States Patent
Judd

(12) 
(10) Patent No.: US 10,545,445 B2
(45) Date of Patent: Jan. 28, 2020

(54) IMAGE FORMING APPARATUS THAT FORMS IMAGE ON RECORDING SHEET, AND IMAGE FORMING SYSTEM

(71) Applicant: KYOCERA Document Solutions Inc., Osaka (JP)

(72) Inventor: Isaac Judd, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 16/363,121

(22) Filed: Mar. 25, 2019

(65) Prior Publication Data
US 2019/0302666 A1   Oct. 3, 2019

(30) Foreign Application Priority Data
Mar. 30, 2018 (JP) .................. 2018-069876

(51) Int. Cl.
*G03G 15/00* (2006.01)
*H04N 1/00* (2006.01)

(52) U.S. Cl.
CPC ......... *G03G 15/5016* (2013.01); *H04N 1/001* (2013.01); *H04N 1/00408* (2013.01)

(58) Field of Classification Search
CPC ..... G03G 15/5016; G03G 2215/00789; H04N 1/00408
See application file for complete search history.

(56) References Cited

FOREIGN PATENT DOCUMENTS

| JP | 11284835 A | * | 10/1999 |
| JP | 2001051555 A | * | 2/2001 |
| JP | 2002-108148 A | | 4/2002 |

OTHER PUBLICATIONS

Yamamoto (JP 2001-051555 A), Feb. 2001, JPO Computer Translation (Year: 2001).*

* cited by examiner

*Primary Examiner* — Erika J Villaluna
(74) *Attorney, Agent, or Firm* — IP Business Solutions, LLC

(57) ABSTRACT

An image forming apparatus includes a display unit, an image forming unit, and a control unit. The image forming unit forms an image on a recording sheet. The control unit includes a processor, and acts as a controller when the processor executes a control program. The controller calculates a coverage rate to be realized when the image is formed on the recording sheet, decides a recycle category of the recording sheet according to the coverage rate, and either causes the display unit to display the recycle category, or causes the image forming unit to form an image of the recycle category on the recording sheet, together with the image.

7 Claims, 8 Drawing Sheets

Fig.2

| PAPER TYPE | COVERAGE RATE | RECYCLE CATEGORY |
|---|---|---|
| NON-RECYCLED PAPER | LOWER THAN 25% | CATEGORY A |
| | 25% OR HIGHER, LOWER THAN 75% | CATEGORY B |
| | 75% OR HIGHER | CATEGORY C |
| RECYCLED PAPER | — | CATEGORY D |

IMAGE FORMING APPARATUS THAT FORMS IMAGE ON RECORDING SHEET, AND IMAGE FORMING SYSTEM

INCORPORATION BY REFERENCE

This application claims priority to Japanese Patent Application No. 2018-069876 filed on Mar. 30, 2018, the entire contents of which are incorporated by reference herein.

BACKGROUND

The present disclosure relates to an image forming apparatus that forms an image on a recording sheet, and image forming system, and more particularly to a technique to facilitate a recycle categorization work with respect to the recording sheets having an image formed thereon.

Although promotion of recycling is required in relation to image forming apparatuses, the recycling work is far from easy because the image forming apparatuses include a large variety of objects to be recycled. Accordingly, for example, a technique to facilitate the handling of consumables of the image forming apparatus has been proposed, the technique including storing specific conditions of the consumables and recycling information in a memory, collating the condition of the consumables with the specific conditions stored in the memory, and notifying that the consumables are in accordance when the condition agrees with the specific condition, thereby allowing the recycle information stored in the memory to be confirmed.

SUMMARY

The disclosure proposes further improvement of the foregoing technique.

In an aspect, the disclosure provides an image forming apparatus including a display unit, an image forming unit, and a control unit. The image forming unit forms an image on a recording sheet. The control unit includes a processor, and acts as a controller when the processor executes a control program. The controller calculates a coverage rate to be realized when the image is formed on the recording sheet, decides a recycle category of the recording sheet according to the coverage rate, and either causes the display unit to display the recycle category, or causes the image forming unit to form an image of the recycle category on the recording sheet, together with the image.

In another aspect, the disclosure provides an image forming system including an image forming apparatus, and an information processing apparatus connected to the image forming apparatus via a network. The image forming apparatus includes a first communication unit, an image forming unit, and a control unit. The first communication unit receives an image transmitted from the information processing apparatus through the network. The image forming unit forms the image on a recording sheet. The control unit includes a processor, and acts as a first controller when the processor executes a control program. The first controller calculates a coverage rate of the image with respect to the recording sheet, decides a recycle category of the recording sheet according to the coverage rate, and causes the first communication unit to transmit the recycle category to the information processing apparatus through the network. The information processing apparatus includes a storage unit, a second communication unit, and a control unit. The second communication unit transmits the image to the image forming apparatus, and receives the recycle category. The control unit includes a processor, and acts as a second controller when the processor executes a control program. The second controller stores the image and the recycle category in the storage unit, in association with each other.

BRIEF DESCRIPTION OF THE DRAWINGS

FIG. 2 is a data table schematically representing correspondences among coverage rates, types of paper, and recycle categories.

DETAILED DESCRIPTION

Hereafter, an image forming system according to an embodiment of the disclosure will be described, with reference to the drawings.

Figure 1:
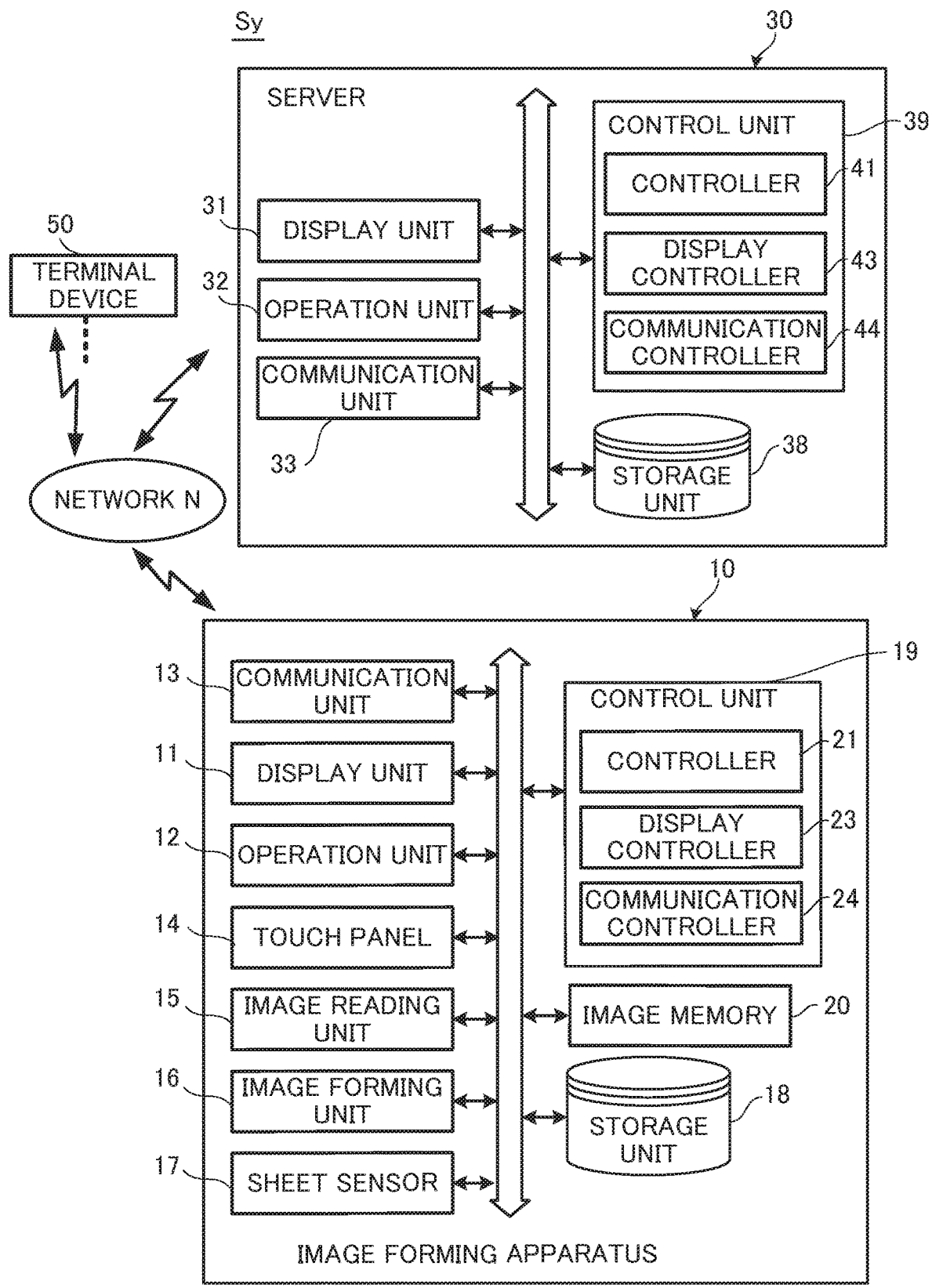
FIG. 1 is a block diagram showing a configuration of an image forming system according to an embodiment of the disclosure.

FIG. 1 is a block diagram showing a configuration of the image forming system according to the embodiment of the disclosure. The image forming system Sy according to the embodiment includes the image forming apparatus 10, a server 30, and a terminal device 50, connected to each other via a network N.

In the image forming system Sy, the image forming apparatus 10 includes a display unit 11, an operation unit 12, a communication unit 13, a touch panel 14, an image reading unit 15, an image forming unit 16, a sheet sensor 17, a storage unit 18, an image memory 20, and a control unit 19. The mentioned elements are configured to transmit and receive data or signals to and from each other, through a bus.

The display unit 11 includes, for example, a liquid crystal display (LCD) or an organic light-emitting diode (OLED) display. The operation unit 12 includes hard keys such as a tenkey, an enter key, and a start key.

The touch panel 14 is provided on the screen of the display unit 11. The touch panel 14 is based on a resistive film or electrostatic capacitance, and configured to detect a contact (touch) made by a finger of the user or the like, along with the touched position, and output a detection signal indicating the coordinate position of the touched position, to a controller 21 of the control unit 19, to be subsequently described.

The communication unit 13 is a communication interface including a communication module such as a non-illustrated LAN chip. The communication unit 13 is connected to the server 30 and the terminal device 50 via the network N, to transmit and receive data to and from the server 30 and the terminal device 50.

The image reading unit 15 includes a scanner that optically reads a source document placed on a contact glass, and generates image data representing the image of the source document.

The image memory 20 temporarily stores therein the image data representing the image of the source document read by the image reading unit 15, and the image data received by the communication unit 13.

The image forming unit 16 includes a photoconductor drum, a charging device that uniformly charges the surface of the photoconductor drum, an exposure device that exposes the surface of the photoconductor drum to light, thus to form an electrostatic latent image on the surface of the photoconductor drum, a developing device that develops the electrostatic latent image on the surface of the photoconductor drum into a toner image, and a transfer device that transfers the toner image on the surface of the photoconductor drum onto the recording sheet. The image forming unit 16 forms the image represented by the image data in the image memory 20, on the recording sheet.

The sheet sensor 17 (exemplifying the detection unit in What is claimed is) is attached to the image forming unit 16, to detect a paper type of the recording sheet on which an image is to be formed, and output a detection signal indicating the paper type of the recording sheet. For example, the sheet sensor 17 includes a light emitting element and a photodetector, to emit light from the light emitting element to the recording sheet and receive the reflected light or transmitted light from the recording sheet with the photodetector, and outputs a detection signal indicating the reflectance, transmittance, and wavelength of the light, on the basis of the detection output of the photodetector. The reflectance, transmittance, and wavelength of the light indicated by the detection signal correspond to the paper type of the recording sheet, and vary depending on the paper type. The controller 21 decides, on the basis of the detection signal from the sheet sensor 17, whether the recording sheet is a non-recycled paper or a recycled paper. Here, a known thickness sensor that detects a thickness of the recording sheet may be provided, in addition to the sheet sensor 17, to decide whether the recording sheet is a non-recycled paper or a recycled paper, on the basis of the detection signal from the sheet sensor 17 and the detection signal from the thickness sensor.

The storage unit 18 is a large-capacity storage device such as a solid-state drive (SSD) or a hard disk drive (HDD), and contains various application programs and various types of information.

The control unit 19 includes a processor, a random-access memory (RAM), a read-only memory (ROM), and so forth. The processor is, for example, a CPU, an MPU, an ASIC, or the like. The control unit 19 acts as the controller 21, a display controller 23, and a communication controller 24, when the processor executes a control program stored in the ROM or the storage unit 18.

The controller 21 integratedly controls the image forming apparatus 10. The controller 21 is connected to the display unit 11, the operation unit 12, the communication unit 13, the touch panel 14, the image reading unit 15, the image forming unit 16, the sheet sensor 17, the storage unit 18, and the image memory 20, to control the operation of the cited elements, and transmit and receive signals or data to and from the mentioned elements.

The controller 21 acts as a processing unit that executes the operations necessary for the image forming apparatus 10 to form an image. The display controller 23 is configured to control the displaying operation of the display unit 11. The communication controller 24 is configured to control the communicating operation of the communication unit 13.

In the image forming system Sy, the server 30 (exemplifying the information processing apparatus in What is claimed is) is for example a work station, including a display unit 31, an operation unit 32, a communication unit 33, a storage unit 38, and a control unit 39. The mentioned elements are configured to transmit and receive data or signals to and from each other, through a bus.

The display unit 31 includes, for example, a liquid crystal display or an organic electroluminescence display.

The operation unit 32 includes, for example, a key board and a pointing device to be operated by the user.

The communication unit 33 is a communication interface, connected to the image forming apparatus 10 and the terminal device 50 via the network N, to transmit and receive data to and from the image forming apparatus 10 and the terminal device 50.

The storage unit 38 is a large-capacity storage device such as an SSD or an HDD, and contains various application programs and various types of information.

The control unit 39 includes a processor, a RAM, a ROM, and so forth. The control unit 39 acts as a controller 41, a display controller 43, and a communication controller 44, when the processor executes a control program stored in the ROM or the storage unit 38. Here, the elements of the control unit 39 may each be constituted in the form of a hardware circuit, instead of being performed according to the program.

The controller 41 controls the overall operation of the server 30. The controller 41 is connected to the display unit 31, the operation unit 32, the communication unit 33, and the storage unit 38, to control the operation of the cited elements, and transmit and receive signals or data to and from the mentioned elements.

The controller 41 acts as a processing unit that executes a process instructed through the operation unit 32. The display controller 43 is configured to control the displaying operation of the display unit 31. The communication controller 44 is configured to control the communicating operation of the communication unit 33.

In the image forming system Sy, further, the terminal device 50 is a known personal computer (PC), including a display unit, a processor, an I/O device, a storage, a key board, a pointing device, and so forth. The terminal device 50 is connected to the image forming apparatus 10 and the server 30 via the network N, to transmit and receive data to and from the image forming apparatus 10 and the server 30.

In the image forming apparatus 10 according to the embodiment, the controller 21 calculates, when the image forming unit 16 is about to form an image on the recording sheet, a coverage rate of the image with respect to the recording sheet, on the basis of the image to be formed, and decides whether the recording sheet is a non-recycled paper or a recycled paper, according to the detection signal from the sheet sensor 17. Then the controller 21 decides the recycle category of the recording sheet on the basis of the coverage rate and the decision result, and either displays the recycle category on the display unit 11, or causes the image forming unit 16 to form the image representing the recycle category on the recording sheet, together with the first mentioned image.

FIG. 2 represents a data table DT, in which the correspondences among the coverage rates, types of paper, and the recycle categories are registered. The data table DT is stored in the storage unit 18.

With respect to the non-recycled paper, as shown in FIG. 2, the coverage rate lower than 25%, the coverage rate equal to or higher than 25% and lower than 75%, and the coverage rate equal to or higher than 75% are associated with the recycle categories A, B, and C, respectively. The recycled paper is associated with the recycle category D, regardless of the coverage rate. Thus, the data table DT specifies the recycle categories on the basis of the paper type and the coverage rate, such that the recording sheet made of the non-recycled paper and the coverage rate of which is lower than 25% corresponds to the recycle category A, the recording sheet made of the non-recycled paper and the coverage rate of which is equal to or higher than 25% and lower than 75% corresponds to the recycle category B, the recording sheet made of the non-recycled paper and the coverage rate of which is equal to or higher than 75% corresponds to the recycle category C, and the recording sheet made of the recycled paper corresponds to the recycle category D.

As described above, the controller 21 calculates the coverage rate, and also decides whether the recording sheet is a non-recycled paper or a recycled paper. The controller 21 then looks up the data table DT in the storage unit 18, to decide the recycle category of the recording sheet corresponding to the calculated coverage rate and the decision result of the paper type, and either displays the recycle category on the display unit 11, or forms the image of the recycle category on the recording sheet.

Therefore, the user can easily sort out the recording sheets, in view of the recycle category displayed on the display unit 11, or printed on the recording sheet.

Here, although the data table DT of FIG. 2 represents the correspondences among the coverage rate, paper type, and recycle category, the recycle category may be specified depending on whether the image is printed in color or B/W, in addition to the coverage rate and the paper type.

In addition, the controller 21 may retrieve the data table DT from the storage unit 18 and cause the display controller 23 to display the data table DT on the display unit 11, to thereby allow the user to visually check the data table DT and to modify the content of the data table DT through the operation unit 12 or the touch panel 14. Then the controller 21 may store the modified data table DT in the storage unit 18, thereby updating the data table DT.

Referring now to the flowchart shown in FIG. 3, the process of deciding the recycle category of the recording sheet, on the basis of the coverage rate and the distinction between the non-recycled paper and the recycled paper, and displaying the recycle category on the display unit 11 or forming the image of the recycle category on the recording sheet, will be described hereunder.

Figure 4:
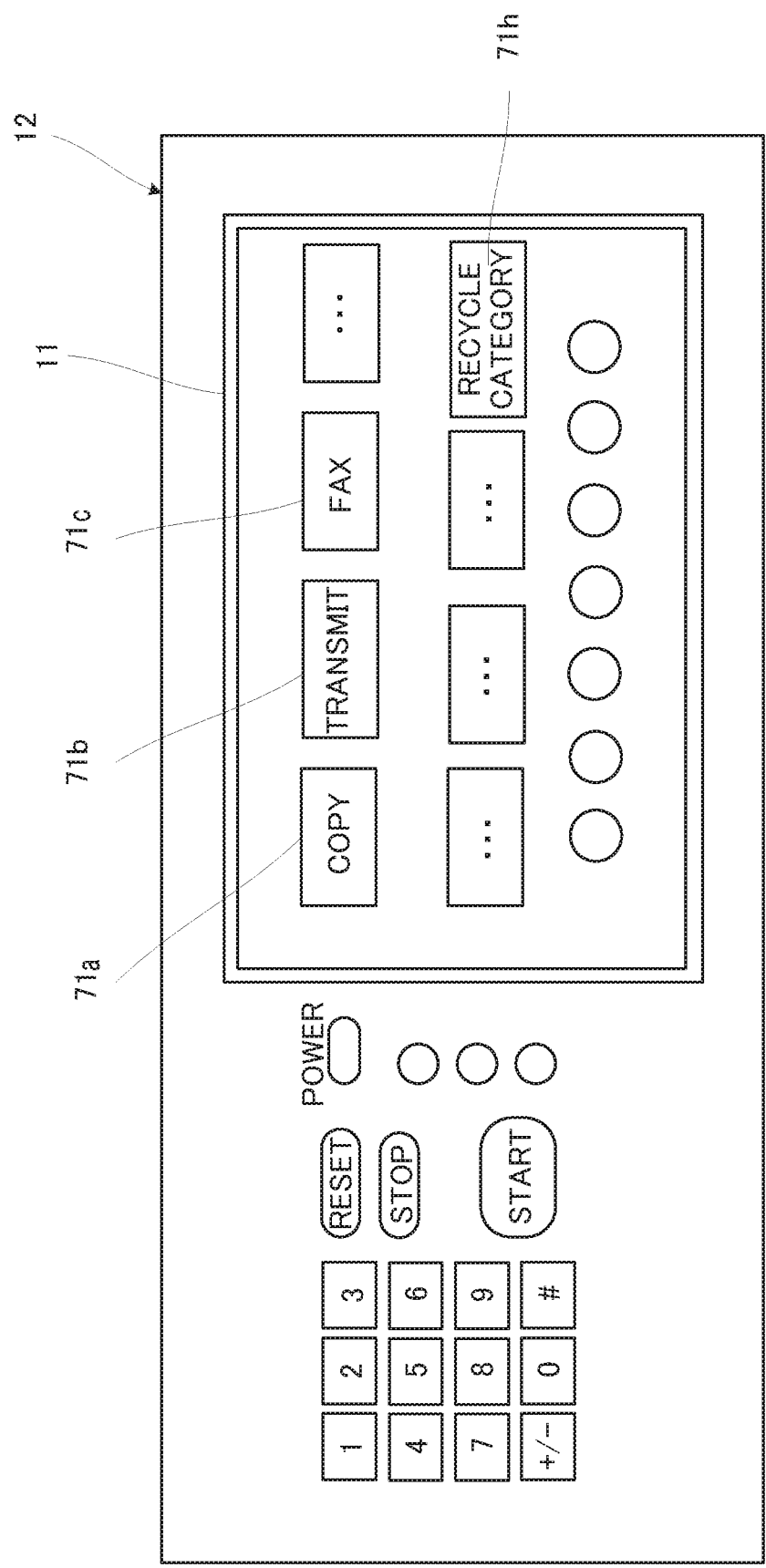
FIG. 4 is a schematic drawing showing an initial screen displayed on a display unit of the image forming apparatus.
Figure 5:
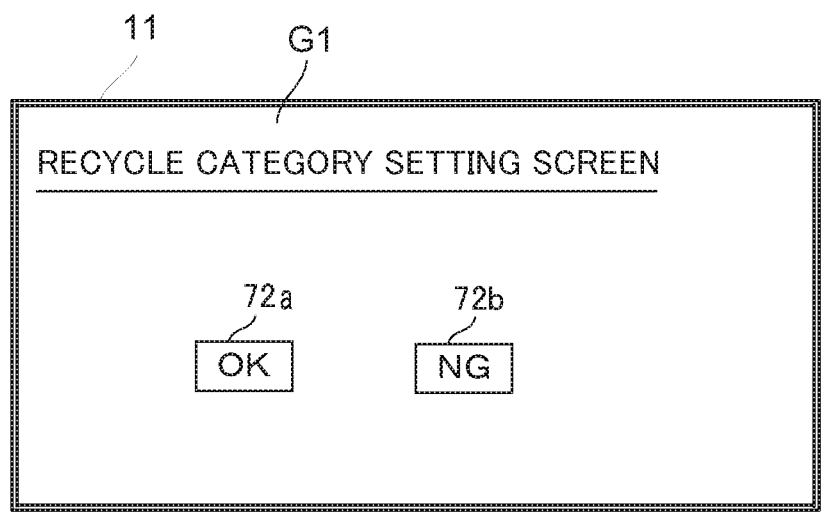
FIG. 5 is a schematic drawing showing a screen for setting the recycle category, displayed on the display unit of the image forming apparatus.

To start with, it will be assumed that the display controller 23 has caused the display unit 11 of the image forming apparatus 10 to display an initial screen, on which a plurality of keys 71a to 71h, each corresponding to a specific function, are arranged as shown in FIG. 4. When the user touches the key 71h corresponding to the recycle category, the controller 21 detects the touch operation made on the key 71h through the touch panel 14, and causes the display controller 23 to display a setting screen G1 of the recycle category shown in FIG. 5, on the screen of the display unit 11 (S101). The recycle category setting screen G1 exhibits an OK key 72a and an NG key 72b, for instructing whether to print the recycle category on the recording sheet. For example, when the user touches the OK key 72a, the controller 21 detects the touch operation made on the OK key 72a through the touch panel 14 (OK at S102), and sets up the printing of the recycle category (S103). In contrast, when the user touches the NG key 72b, the controller 21 detects the touch operation made on the NG key 72b through the touch panel 14 (NG at S102), and does not set up the printing of the recycle category (S104).

After the printing of the recycle category is thus instructed or restricted, the controller 21 stands by for an instruction to copy the image of a source document, made through the operation unit 12 or the touch panel 14, or for reception of an image transmitted from the server 30, through the communication unit 13 (No at S105).

When the user sets a source document on the image reading unit 15, and instruct to execute copying by operating the operation unit 12 or the touch panel 14 (Yes at S105), the controller 21 causes the image reading unit 15 to read the image of the source document, and once stores the image data representing the document image in the image memory 20 (S106).

The image forming apparatus 10 may also receive image data transmitted from the server 30 or the terminal device 50 such as a personal computer, and form the image represented by the image data. In this case, upon receipt of the image data transmitted from the server 30 or the terminal device 50 (hereinafter, simply server 30) through the communication unit 13 (Yes at S105), the controller 21 of the image forming apparatus 10 once stores the image data thus received, in the image memory 20 (S106).

The controller 21 then calculates the coverage rate of the image with respect to the recording sheet to be utilized by the image forming unit 16, on the basis of the image data in the image memory 20 (S108). The controller 21 calculates the coverage rate by a known method, on the basis of the density of the image, the size and type of the characters to be printed, and so forth. Further, in the case where the image is to be formed on both sides of the recording sheet, the controller 21 calculates the total of the coverage rate of each side of the recording sheet, as the coverage rate of the recording sheet.

In addition, the controller 21 decides whether the recording sheet is a non-recycled paper or a recycled paper, according to the detection signal from the sheet sensor 17 (S109).

Figure 6:
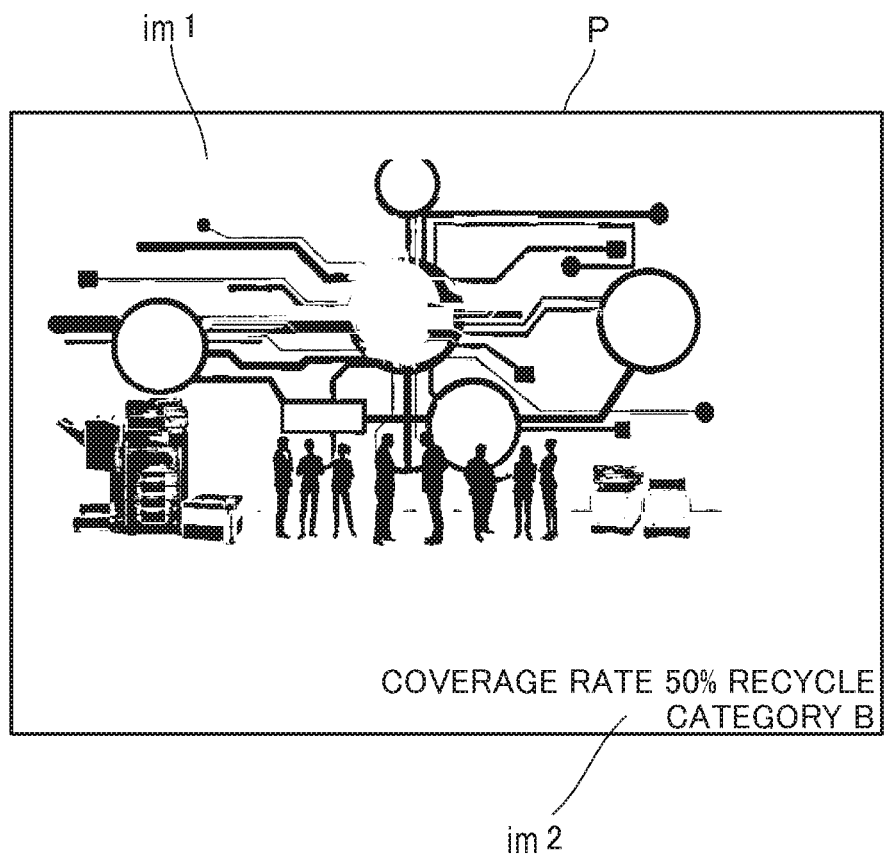
FIG. 6 is a schematic drawing showing a recording sheet on which an image, a coverage rate, and a recycle category are printed.

Then the controller 21 looks up the data table DT in the storage unit 18, to decide the recycle category of the recording sheet, corresponding to the coverage rate and the paper type (S110), and displays the coverage rate and the recycle category on the display unit 11 (S111). In the case where the printing of the recycle category has been set up at S103 (Yes at S112), the controller 21 causes the image forming unit 16 to form an image representing the coverage rate and the recycle category on the recording sheet, together with the image supposed to be formed (S113). For example as shown in FIG. 6, the controller 21 forms an image im1, which is the image supposed to be formed, on the recording sheet P, and also an image im2 representing the coverage rate and the recycle category, in a blank region of the recording sheet P where the image im1 is not formed. Alternatively, the controller 21 may cause the image forming unit 16 to form the image im2 representing the coverage rate and the recycle category, on the back face of the recording sheet P (i.e., face of the recording sheet P opposite to the front face on which the image im1 is formed).

Here, in the case of "Yes" at S112, the display controller 23 may, before proceeding to S113, cause the display unit 11 to display a screen for the user to input an instruction to change the coverage rate and the recycle category, so that, upon receipt of the user's instruction to change the coverage rate or the recycle category through the operation unit 12, the controller 21 may change the coverage rate or the recycle category according to the instruction, and cause the image forming unit 16 to form the image representing the changed coverage rate or recycle category on the recording sheet, together with the image supposed to be formed.

In contrast, in the case where the printing of the recycle category has not been set up at S104 (No at S112), the controller 21 causes the image forming unit 16 to form only the image supposed to be formed on the recording sheet, without forming the image representing the coverage rate and the recycle category (S114).

Upon completing the operation up to S113 or S114, the controller 21 decides whether the image data has been transmitted from the server 30 and received through the communication unit 13 (S115). In the case where the controller 21 decides that the image data has been received from the server 30 (Yes at S115), the communication controller 24 causes the communication unit 13 to transmit information indicating the coverage rate calculated at S108 and the recycle category decided at S110, to the server 30 (S116). At this point, the operation is finished.

In the case where the controller 21 decides that the image data is not the one transmitted from the server 30 and received through the communication unit 13 (No at S115), the operation is finished, without proceeding to S116.

As described above, in the image forming apparatus 10 according to the embodiment, the controller 21 calculates the coverage rate of the image with respect to the recording sheet, and decides whether the recording sheet is a non-recycled paper or a recycled paper. Then the controller 21 decides the recycle category of the recording sheet on the basis of the coverage rate and the decision result, and either displays the recycle category on the display unit 11, or causes the image forming unit 16 to print the recycle category on the recording sheet, together with the image. Therefore, the user can visually recognize the recycle category of the recording sheet instantly, and easily decide to which of the categories A to D the recording sheet is to be sorted out.

Now, the consumables related to the image forming apparatus include the recording sheet, which is also an object of recycling. To reuse the recording sheet by recycling, the recording sheet has to be classified according to the coverage rate of the image with respect to the recording sheet. This is because a high coverage rate means that a large amount of toner is stuck, and therefore the recyclability of the recording sheet is low. Conversely, a low coverage rate means that only a small amount toner is stuck, and therefore the recyclability of the recording sheet is high. In addition, the recycle category of the recording sheet also varies depending on whether the recording sheet is a non-recycled paper or a recycled paper.

However, it is difficult to recognize the coverage rate of the image with respect to the recording sheet, or identify whether the recording sheet is a non-recycled paper or a recycled paper. Therefore, it is a burden for the user to sort out the recording sheets according to the recycle category, and such burden is multiplied when a large number of recording sheets have to be handled.

The foregoing technique according to the background art is intended to handle the consumables in the main body of the image forming apparatus, such as a developing device, a transfer device, a cleaner, a toner cartridge and so forth, as objects of recycling. The recording sheet is not included in the objects of recycling, and therefore no reference is made to facilitating the work to sort out the recording sheets.

In contrast, the configuration according to the embodiment allows the recording sheets on which an image has been formed by the image forming apparatus to be easily sorted out, according to the recycle category.

Figure 7:
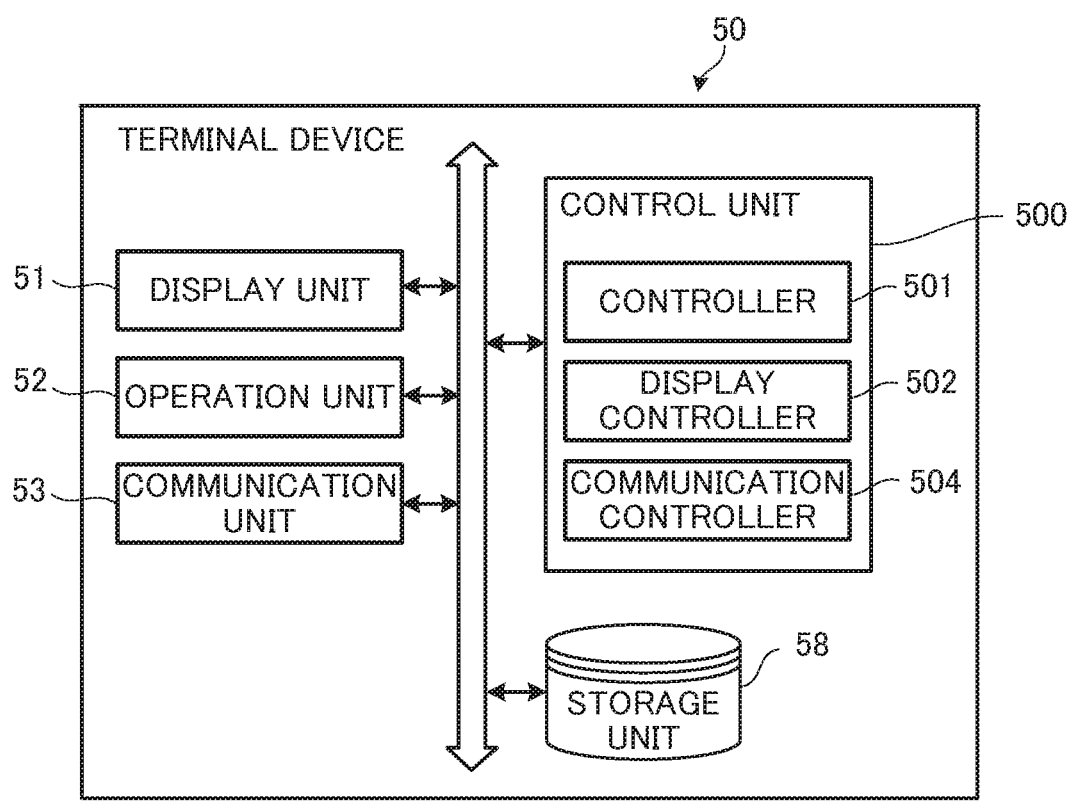
FIG. 7 is a block diagram showing a configuration of a terminal device.

Hereunder, an application example of the image forming system Sy will be described. FIG. 7 is a block diagram showing a configuration of the terminal device 50.

The terminal device 50 (exemplifying the information processing apparatus) is, for example, a personal computer, and includes a display unit 51, an operation unit 52, a communication unit 53, a storage unit 58, and a control unit 500. The mentioned elements are configured to transmit and receive data or signals to and from each other, through a bus.

The display unit 51 includes, for example, a liquid crystal display or an organic electroluminescence display.

The operation unit 52 includes, for example, a key board and a pointing device to be operated by the user.

The communication unit 53 is a communication interface, connected to the image forming apparatus 10 and the server 30 via the network N, to transmit and receive data to and from the image forming apparatus 10 and the server 30.

The storage unit 58 is a large-capacity storage device such as an SSD or an HDD, and contains various application programs and various types of information.

The control unit 500 includes a processor, a RAM, a ROM, and so forth. The control unit 500 acts as a controller 501, a display controller 502, and a communication controller 504, when the processor executes a control program stored in the ROM or the storage unit 58. Here, the elements of the control unit 500 may each be constituted in the form of a hardware circuit, instead of being performed according to the program.

The controller 501 controls the overall operation of the terminal device 50. The controller 501 is connected to the display unit 51, the operation unit 52, the communication unit 53, and the storage unit 58, to control the operation of the cited elements, and transmit and receive signals or data to and from the mentioned elements.

The controller 501 acts as a processing unit that executes a process instructed through the operation unit 52. The display controller 502 is configured to control the displaying operation of the display unit 51. The communication controller 504 is configured to control the communicating operation of the communication unit 53.

Figure 3:
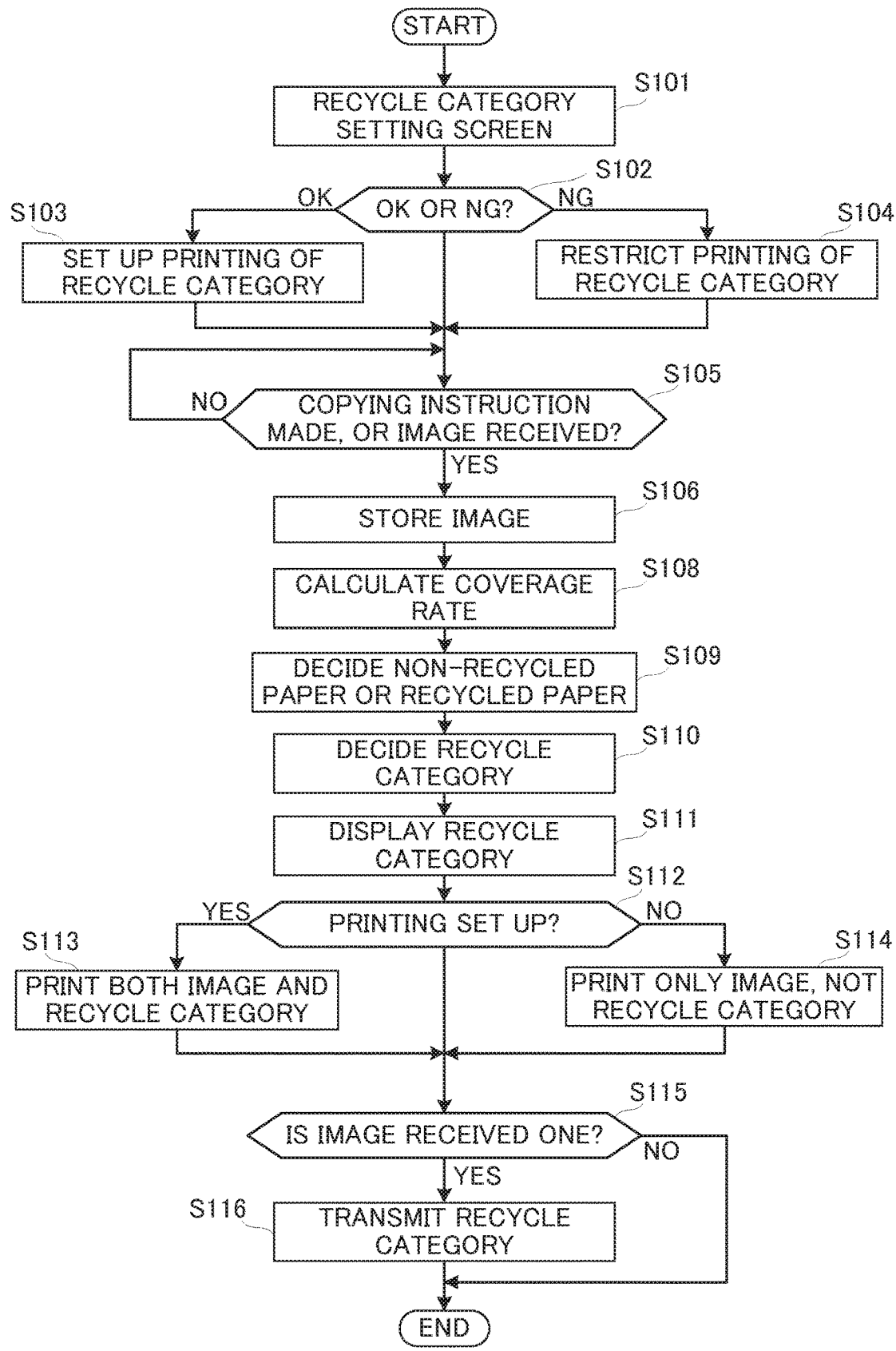
FIG. 3 is a flowchart showing an operation process performed by the image forming apparatus in the image forming system according to the embodiment.

For example, the user transmits the image data from the terminal device 50 to the image forming apparatus 10, to print a necessary number of sheets through the printing operation according to FIG. 3, and hands out the printed materials to the attendees of a presentation. In this case, the image forming apparatus 10 transmits the information indicating the coverage rate and the recycle category related to the printing operation to the terminal device 50, as described with reference to S116 in FIG. 3. Therefore, the terminal device 50 receives the information indicating the coverage rate and the recycle category, from the image forming apparatus 10.

In the terminal device 50, when the information indicating the coverage rate and the recycle category is received by the communication unit 53, the controller 501 stores the information indicating the coverage rate and the recycle category in the storage unit 58, in association with the image data transmitted to the image forming apparatus 10.

Thereafter, the user designates the mentioned image data as the material to be used for the presentation, through the operation unit 52. At this point, the controller 501 decides whether the designated image data is stored in the storage unit 58 in association with the information indicating the coverage rate and the recycle category, and generates, when the information indicating the coverage rate and the recycle category is stored in association, an image representing the coverage rate and the recycle category, and synthesizes the image with the image data, and then displays the synthesized image data, for example through a projector connected to the terminal device 50.

Figure 8:
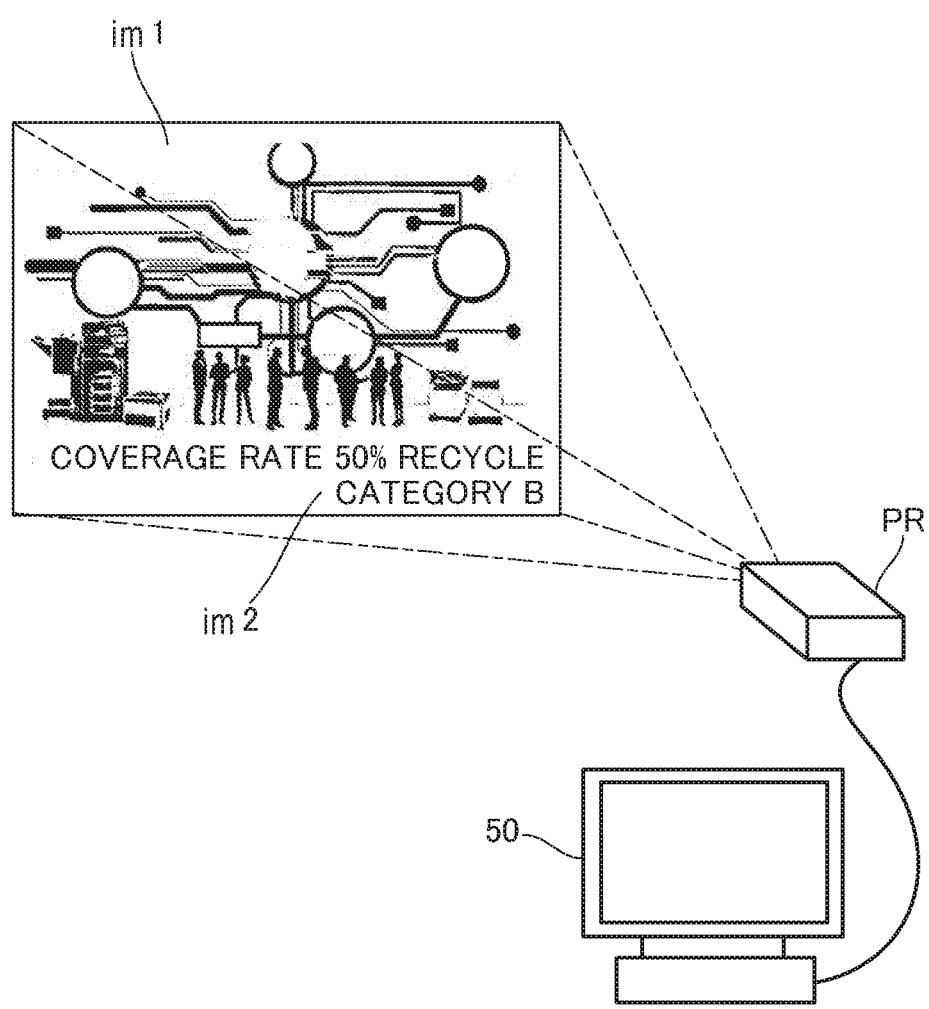
FIG. 8 is a schematic drawing showing the image, the coverage rate, and the recycle category displayed through a projector.

For example as shown in FIG. 8, the image prepared for the presentation, and the coverage rate and the recycle category are displayed, through the projector PR. The attendees of the presentation can recognize the coverage rate and the recycle category displayed through the projector, regardless of whether the coverage rate and the recycle category are printed on the handout. Thus, the image data printed by the image forming apparatus 10 is accompanied with the coverage rate and the recycle category, while the image data not printed by the image forming apparatus 10 is without the coverage rate and the recycle category.

Although the foregoing description refers to the terminal device 50 as example, the server 30 can also receive the information indicating the coverage rate and the recycle category related to the image data, from the image forming apparatus 10. In this case, for example a person who received the handout for the presentation but didn't attend the presentation can request the server 30, through his/her own terminal device 50, to transmit the image data representing the image prepared for the presentation. In response, the communication controller 44 of the server 30 causes the communication unit 33 to transmit the information indicating the coverage rate and the recycle category, stored in the storage unit 38 in association with the requested image data, to this person's terminal device 50, together with the requested image data.

In the terminal device 50, likewise, when the communication unit 53 receives the information indicating the coverage rate and the recycle category, the controller 501 stores the information indicating the coverage rate and the recycle category in the storage unit 58, in association with the image data transmitted to the image forming apparatus 10.

With the mentioned arrangement, the terminal device 50 can display, upon receipt of the synthesized image data from the server 30, the image data in which the image representing the coverage rate and the recycle category as above, when displaying the image data prepared for the presentation, for example on the display unit 51. Therefore, the person who was absent in the presentation can also recognize the coverage rate and the recycle category, provided on the recording sheet on which the image data is printed.

Here, although the image forming apparatus 10 prints the coverage rate and the recycle category on each of the recording sheets, the controller 21 may control the image forming unit 16, when the user instructs to print a plurality of sets through the operation unit 12 or the touch panel 14, so as to print the coverage rate and the recycle category only on the recording sheet of the first set, and not on the recording sheets of the second and subsequent sets.

In addition, when the same image is to be repeatedly printed on each of the recording sheets, the controller 21 may cause the image forming unit 16 to form the image representing the coverage rate and the recycle category only on the first one of the recording sheets, and not on the second and subsequent ones of the recording sheets.

Further, although the controller 21 according to the embodiment is configured to decide whether the recording sheet is a non-recycled paper or a recycled paper, on the basis of the detection signal from the sheet sensor 17 or the thickness sensor, whether the recording sheet is a non-recycled paper or a recycled paper may be inputted through the operation unit 12 or the touch panel 14, to thereby allow the controller 21 to decide whether the recording sheet is a non-recycled paper or a recycled paper, according to the input. For example, when the image forming apparatus 10 includes a manual bypass tray, the user may specify, through the operation unit 12 or the touch panel 14, whether the recording sheet is a non-recycled paper or a recycled paper, when setting the recording sheet on the manual bypass tray. Alternatively, the image forming apparatus 10 may include a plurality of paper feed cassettes, such that the non-recycled paper and the recycled paper are separately stored in the respective paper feed cassettes. In this case, when the recording sheet is supplied from one of the paper feed cassettes designated by the user through the operation unit 12 or the touch panel 14, the controller 21 may decide whether the recording sheet is a non-recycled paper or a recycled paper, on the basis of the paper feed cassette designated as above.

Further, although the image forming apparatus according to the disclosure is exemplified by a multifunction peripheral in the foregoing embodiment, the disclosure is also applicable to other types of image forming apparatus, such as a printer or a facsimile machine.

The configurations and arrangements according to the foregoing embodiment, described with reference to FIG. 1 to FIG. 8, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a display unit;
an image forming unit that forms an image on a recording sheet;
a control unit including a processor, and configured to act as a controller when the processor executes a control program, the controller being configured to:
calculate a coverage rate to be realized when the image is formed on the recording sheet;
decide a recycle category of the recording sheet according to the coverage rate; and
either cause the display unit to display the recycle category, or cause the image forming unit to form an image of the recycle category on the recording sheet, together with the image, and
a detection unit that detects a paper type of the recording sheet,
wherein the controller decides whether the recording sheet is a non-recycled paper or a recycled paper, on a basis of the paper type of the recording sheet detected by the detection unit, and decides the recycle category depending on the coverage rate and the decision whether the recording sheet is a non-recycled paper or a recycled paper.

2. The image forming apparatus according to claim 1, wherein the controller causes the image forming unit to form an image representing the coverage rate on the recording sheet, together with an image representing the recycle category decided.

3. The image forming apparatus according to claim 2, wherein the controller forms, when forming the image, the image representing the coverage rate and the recycle category decided, in a blank margin of the recording sheet where the image is not formed, or forms the image representing the coverage rate and the recycle category decided, on a back face of the recording sheet.

4. The image forming apparatus according to claim 1, further comprising an operation unit to be operated by a user, wherein the controller changes the coverage rate and the recycle category, according to an instruction inputted through the operation unit.

5. The image forming apparatus according to claim 4, wherein the control unit is further configured to act, when the processor executes the control program, as a display controller that controls a displaying operation of the display unit, the display controller being configured to causes the display unit, before causing the image forming unit to form the image, to display a screen for the user to input a change of the coverage rate and the recycle category, and the controller changes, when the instruction from the user to change the coverage rate and the recycle category is inputted through the operation unit, the coverage rate and the recycle category according to a content of the instruction.

6. The image forming apparatus according to claim 1, wherein the controller causes the image forming unit, when the image is to be formed on a plurality of sets of recording sheets, to form the image representing the recycle category of the recording sheet, only on the recording sheet of a first set.

7. An image forming system comprising:
an image forming apparatus; and
an information processing apparatus connected to the image forming apparatus via a network,
wherein the image forming apparatus includes:

a first communication unit that receives an image transmitted from the information processing apparatus through the network;
an image forming unit that forms the image on a recording sheet;
a detection unit that detects a paper type of the recording sheet; and
a control unit including a processor, and configured to act as a first controller when the processor executes a control program, the first controller being configured to:
  calculate a coverage rate of the image with respect to the recording sheet;
  decide whether the recording sheet is a non-recycled paper or a recycled paper, on a basis of the paper type of the recording sheet detected by the detection unit;
  decide a recycle category of the recording sheet depending on the coverage rate and the decision whether the recording sheet is a non-recycled paper or a recycled paper; and
  cause the first communication unit to transmit the recycle category to the information processing apparatus through the network, and
the information processing apparatus includes:
  a storage unit;
  a second communication unit that transmits the image to the image forming apparatus, and receives the recycle category; and
  a control unit including a processor, and configured to act as a second controller when the processor executes a control program, the second controller being configured to store the image and the recycle category in the storage unit, in association with each other.

* * * * *